HIGH-SPEED SEMICONDUCTOR SWITCH

Filed Oct. 23, 1965

WITNESSES:
John L. Chopp
James F. Young

INVENTOR
Richard L. Longini
BY
Gordon H. Telfer
ATTORNEY

United States Patent Office 3,403,309

Patented Sept. 24, 1968

3,403,309

HIGH-SPEED SEMICONDUCTOR SWITCH

Richard L. Longini, Pittsburgh, Pa., assignor to Westinghouse Electric Corporation, Pittsburgh, Pa., a corporation of Pennsylvania Filed Oct. 23, 1965, Ser. No. 503,943
11 Claims. (Cl. 317—235)

ABSTRACT OF THE DISCLOSURE

A thyristor in which one load terminal and the gate contact are so arranged as to cause a substantial lateral voltage drop to occur in the first region when the load terminals are connected in a load circuit and turn-on is initiated by a signal applied to the gate contact.

This application is directed to improvements in semiconductor switches, particularly to reducing the required turn-on time. The application particularly relates to switches of at least four regions and three terminals often referred to as controlled rectifiers, thyristors or gate controlled switches. The term "controlled rectifier" will be used herein to encompass all such devices.

Studies of controlled rectifier turn-on behavior show that even with junctions and electrodes of relatively large area the conditions existing during turn-on cause localized high current densities that may lead to thermal destruction of the device. This occurs because application of a signal to the gate contact initially turns on only that portion of the device in the immediate area of the gate contact. The current is confined to the turned-on portion, the voltage across the device is still relatively high, and thus the temperature limits of the device may be exceeded even though the current is much less than that which could be carried if all portions of the device were turned on.

It takes a certain time, typically of the order of $10^3$ microseconds, for sufficient carriers to diffuse or otherwise be transported from the vicinity of the gate contact to other portions of the base region so that the device is fully turned on. In applications requiring a response time of the order of a microsecond it is clear that conventional controlled rectifiers are unsatisfactory.

As noted, the relatively long turn-on time of present devices is in part due to the relatively large distances that carriers have to diffuse through the device to effect turn-on. It is therefore true, in general, that faster turn-on can be achieved with smaller device dimensions as where lateral dimensions are no more than a few carrier diffusion lengths. This is, however, a wholly unsatisfactory alternative because small devices have relatively limited current carrying capacity even when fully turned on. In the field generally referred to as power switching where RMS currents in excess of about 5 amperes, and often as high as a thousand amperes, are required to be handled, large dimensions are required to avoid thermal problems even when all portions of the device are conducting. Thus, a dilemma is presented in which the achievement of large current carrying capacity and high speed turn-on appear to be inconsistent goals.

It is, therefore, an object of the present invention to provide a controlled rectifier of faster turn-on capability than that previously available.

Another object is to provide a controlled rectifier having fast turn-on capability while preserving large current carrying capacity.

Another object is to provide a controlled rectifier having improved turn-on capability but which may be made by relatively little modification of previous fabrication techniques.

The present invention, briefly, achieves the above-mentioned and additional objects and advantages in providing a semiconductor switch of the controlled rectifier type of generally conventional configuration with, however, the load terminal on the emitter region adjacent the contacted base region and the gate contact to that base region being arranged to cause a lateral voltage drop to occur in the emitter region and the adjacent base region at the initiation of turn-on which results in a base-emitter voltage differential so that carriers are quickly injected at remote portions of the device.

The gate contact may be positioned on the base region as usual so that it is uniformly spaced a small distance from part of the p-n junction with the emitter.

The load terminal to the emitter is positioned on a portion of the emitter region that is spaced from the portion of the p-n junction near the gate by a distance that is substantially greater than the depth of the emitter junction.

The present invention, together with the above-mentioned and additional objects and advantages thereof, will be better understood by referring to the following description taken with the accompanying drawing wherein.

Figure 1:
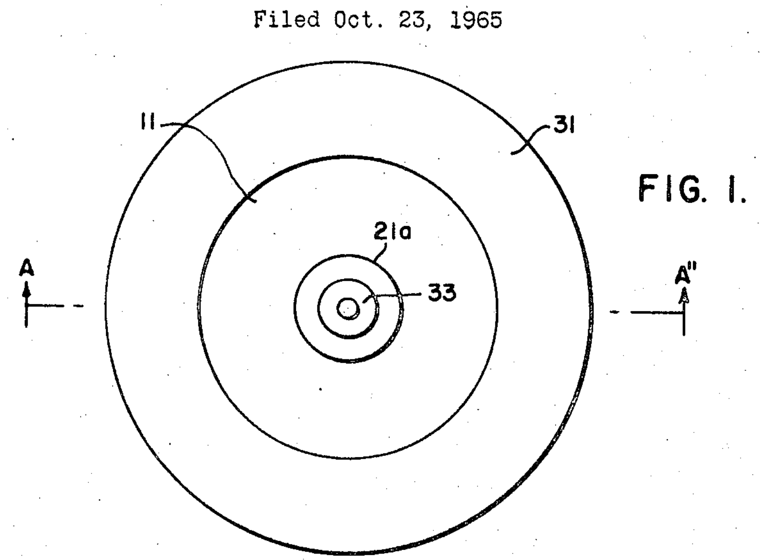
FIGURE 1 is a plan view of an embodiment of the present invention.
Figure 2:
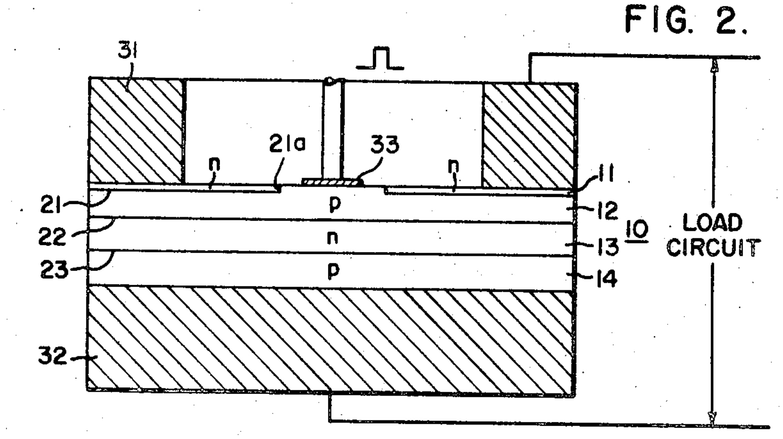
FIG. 2 is a sectional view taken along the line A–A" of the device of FIG. 1.

Referring to FIGS. 1 and 2, there is shown a device in accordance with the present invention. In the drawing the thickness dimensions have been made more exaggerated than the lateral dimensions for clarity. While the invention is shown as embodied in a device of n-p-n-p type with the gate contact to the internal p region, it is apparent that the semiconductivity type of the various regions may be reversed from that shown.

A semiconductor body 10 includes four successive regions 11, 12, 13 and 14 that are, respectively of n, p, n and p semiconductivity type forming, between adjacent pairs of regions, the p-n junctions 21, 22 and 23. In keeping with present controlled rectifier terminology the p-type region 12 will sometimes be called the base region or the contacted base region since region 13 is also sometimes referred to as a base region. Region 11 will be referred to as an emitter or, where necessary to distinguish it from region 14 which also operates as an emitter, it will be referred to as the cathode emitter since, in this example, it is of n-type semiconductivity.

In contact with the cathode emitter 11 is a first load terminal 31. A second load terminal 32 is in electrical contact with region 14 and a gate contact 33 is affixed to the contacted base region 12.

In some respects, the device of FIGS. 1 and 2 is similar to previous devices such as that described in Stein et al. Patent 2,980,832, Apr. 18, 1961, wherein are disclosed many of the principles of controlled rectifier fabrication to enable large current handling capability and which should be referred to for further details.

However, the present device employs a structural modification to enable it to achieve much faster turn-on than that of the previous devices while substantially preserving the large current handling capability. The load terminal 31 on the cathode emitter region 11 and the gate contact 33 on the base region 12 are arranged so as to cause an appreciable lateral voltage drop or electrical field to be established within the emitter and base regions 11 and 12 when the load terminals 31 and 32 are connected in a load circuit and turn-on is initiated by a firing signal applied to the gate contact 33. For this purpose the load terminal 31 is spaced from the inner periphery 21*a* of junction 21 by a distance which is substantially greater (that is, at least an order of magnitude greater) than the depth of the emitter junction 21 which is in direct contrast to prior devices wherein the load terminal is intentionally designed to cover a maximum portion of the emitter region. Even if power handling capability is not of prime importance, the load terminal in prior devices is spaced from the junction periphery by a distance similar to that of the junction depth.

It is to be noted that the practice of the present invention does not require modification of external circuitry. That is, the device is still gate controlled by a relatively small signal applied to the gate contact 33.

As stated, the configuration of load terminal 31 and gate contact 33 are such as to establish a lateral voltage drop that results in injection from emitter to base at the outer portions of the device and speeds up turn-on of all portions. All of the details of the mechanism by which this occurs are not fully understood at this time. A tentative explanation is presented for the further information of those wishing to practice the invention. The successful practice of the invention does not, however, depend on the exact correctness of this explanation.

When the device is in the off state, the fact that the load terminal 31 does not extend across the entire surface of region 11 makes no difference and the device will be in the same condition as a conventional device. When a firing signal is applied to the gate contact 33, a portion of the emitter junction 21*a* in the vicinity of the gate contact injects minority carriers and a load current path is provided through the device but is restricted to the immediate vicinity of the gate contact. This is the same situation as occurs at the initiation of turn-on in a conventional device. However, in a conventional device the turn-on of additional portions of the emitter junction 21 is achieved through the relatively slow process of carrier diffusion and some small lateral voltage drop transport through the base region 12.

In this device, on the other hand, a substantial voltage gradient is established in the emitter region 11, since the voltage in that region near the gate contact drops to a relatively low value while that away from the gate contact is still high, there being no direct short over the entire emitter surface as in the usual device.

For the geometry of the illustrated device, assuming for simplicity that turn-on near the gate is uniform around the inside emitter periphery (which is not exactly true), the voltage drop can be represented by $$V=\frac{I\rho_s}{2}\ln\frac{R}{r}$$

where R is the inner radius of the load terminal 31, $r$ is the inner radius of the emitter region 11 itself, I is the load current and $\rho_s$ represents the resistance per square of the material between the emitter junction portion 21*a* and the load terminal 31. This voltage drop might amount to as much as 100 volts; it will be beneficial even if considerably smaller than that.

The voltage drop in the emitter induces a corresponding voltage drop in the base region 12 resulting in majority current (hole) flow radially outward in the base region 12 which will rapidly cause further portions of the emitter junction to become injecting, being limited essentially only in time by required charging of junction capacitances and being of the order of nanoseconds. Upon those additional portions of the emitter becoming injecting, carriers will diffuse to the junction 22 to establish axial current flow. This latter current flow will take perhaps 50 nanoseconds to be established after all portions of the emitter are injecting.

It is thus determined that, if the power system is able to supply current rapidly, all portions of the device will be turned on in a time of about $1\times10^{-7}$ seconds, this time being about equally divided between the diffusion lag at initial gate turn-on and the diffusion lag following the establishment of carrier injection. The principal current load will build up in a time of less than $5\times10^{-8}$ seconds from its start at the inner periphery of the emitter junction 21*a*. It is considered possible that this very high current build-up may in itself produce an additional effect on the turn-on time.

Because the build-up of current is so fast it may act in effect as a high frequency current pulse, of the order of $10^7$ cycles per second, that produces a skin effect in either the semiconductor or metal, if present, on the surface of emitter 11. This skin effect will result in an additional and aiding radial electric field which will bring current flow to the very outside of the load terminal 31 or the portion of the emitter thereunder. The axial current will extend radially inward at a rate proportional to $t^{-1/2}$ where $t$ is the time of the outward current flow. It is expected that within one microsecond the axial current will be several millimeters from the surface of the device and it is not yet clear how the aiding effect of this phenomenon can be measured.

The axial current flow through the device may not be uniformly distributed, which would be ideal, because of the radial resistance drop and possibly also because of the skin effect. There will, however, be much more area through which current will flow than in conventional controlled rectifiers. This is due to the non-uniform initial turn-on whereas the final turn-on (after $1/10$ $\mu$sec.) is probably far more uniform. The relative current densities are probably only about $1/10$ as great, at most, where $$\frac{R}{r}=2.5$$

a readily achieved value.

It is possible for the second load terminal 32 to be modified in a manner similar to that of the load terminal 31, that is, employing an annular peripherally disposed ring rather than the continuous terminal so that a lateral field is established in the lower emitter region 14 as well. However, it is not believed that this would provide enough improvement to warrant it in most cases as it would cut down the availability of surfaces for thermal cooling and increase fabrication difficulties.

Figure 3:
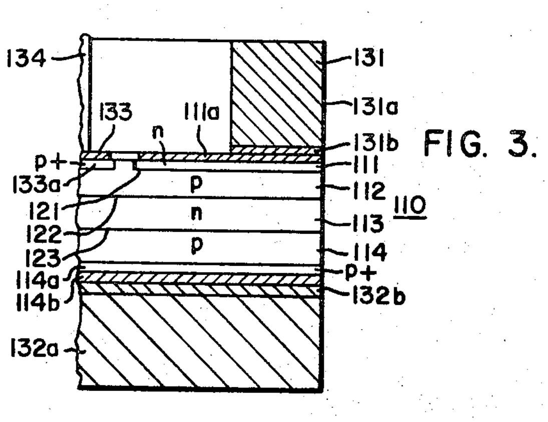
FIG. 3 is a partial sectional view of a device in accordance with this invention illustrating other structural elements.

FIG. 3 shows another embodiment with some more structural details. Elements, where possible, are given reference numerals having the same last two digits as the corresponding elements of the device of FIGS. 1 and 2. The cathode emitter 111 may be formed by either alloying or by impurity diffusion as in conventional devices. If it is formed by alloying, the layer 111*a* of eutectic alloy remaining on the surface after fusion may be retained if sufficiently thin so as not to produce an electrical short that prevents formation of the desired voltage drop through the emitter region 111. Also, if the emitter 111 is formed by diffusion a thin metal layer 111*a* may be added by ultrasonic soldering or otherwise or may be left off the surface.

The load terminals 131 and 132 are metal members whose mass and thickness are several times greater than that of the semiconductor body 110. They may be comprised of a principal member 131*a* and 132*a* of a metal such as molybdenum, tungsten, tantalum or base alloys thereof chosen for both electrical and thermal conductivity and also for having relatively closely matching thermal expansion characteristics with the semiconductor material of body 110 that may be of silicon, although other semiconductor materials and contact materials may be employed. Also considered part of the load terminals 131 and 132 for purposes of considering the present invention is any layer of solder or bonding material 131*b* and 132*b* by which the principal members of the terminals are joined to the emitter 111, or the metalized layer 111*a* and 114*b*. Metallized layer 114*b* is used to make ohmic contact to layer 114.

Either soft soldering with low melting point alloys or the more preferred hard soldering with high melting point alloys of materials such as silver, may be used to join the load terminals 131 and 132. Also they may be joined without a metallurgical bond by the technique known as compression bonding wherein electrical and thermal contact is maintained merely by the pressure across the device. Usually, the bottom load terminal 132 is preferred to be mounted on an even more massive metal member of a good conductor such as copper in a threaded stud or other arrangement for securing to a heat sink. A flexible lead of woven copper, for example, may be bonded to the upper load terminal 131.

In the embodiment illustrated in FIG. 3, *p*+ regions 133*a* and 114*a* are shown adjacent the gate contact 133 and the emitter contact 114*b*, respectively. This is to indicate the regrown regions that might occur through alloy fusion of the gate contact 133 and a metal member 114*b* or they might be diffused regions of higher impurity concentration than the regions 112 and 114 in order to facilitate making a good low resistance ohmic contact thereto. The gate contact 133 has a lead 134 attached thereto for extending from the enclosure of the device which may take various forms in accordance with conventional techniques.

Merely by way of further illustration, the following more specific example of the present invention will be described in connection with FIG. 3.

This example illustrates how thoroughly compatible the present invention is with existing fabrication techniques. Naturally, considerable variation may be made in keeping with the invention. In the following example the dimensions given are merely indicative of a suitable device for securing an improvement in turn-on time in accordance with the present invention.

The starting material may be a body of n-type silicon of monocrystalline structure having a uniform resistivity of about 20 ohms centimeters. The starting material may be circular with a diameter of about 550 mils and a thickness of about 9 mils. Approximately 2 mils of the total surface of the body is diffused with a p-type or acceptor impurity such as gallium or aluminum to produce a p-type region extending around the surface with a surface concentration of about $10^{18}$ atoms per cubic centimeter. Alloy foil members are positioned to form the gate contact 133, the emitter 111 and the contact to the bottom region 114*b*. The alloy foil for the emitter may be principally of gold with a small amount, 0.1% for example, of antimony of annular configuration with an inner diameter of about 75 mils and an outer diameter of about 500 mils and a thickness of about 1 mil. The alloys for the ohmic contacts may be principally of gold with a small amount of boron, 0.5% by weight for example, about 1 mil thick, with the foil member for contact 114*b* extending entirely across the bottom surface of the device and the contact 133 for the gate having a diameter of about 60 mils.

After these foils are arranged on the body of diffused silicon they are fused so that the recrystallized regions 113*a*, 114*a*, and 111 are formed with thin layers of eutectic alloy 133, 114*a* and 111*a* remaining thereon. The regions 133*a*, 114*a* and 111 will be about one-half mil thick.

By a hard soldering operation using silver alloy preforms, molybdenum members having a thickness of about 100 mils may be joined to each of the layers 111*a* and 114*b* for the load terminals with that on the cathode emitter having an inner diameter of about 350 mils and an outer diameter of about 500 mils so that there is sufficient differential in the emitter junction area and that portion covered by the load terminal to permit the establishment of a lateral voltage gradient as previously described herein. The edge of the silicon wafer is removed as by sand blasting or etching so as to separate the p-type layer into separate portions for regions 112 and 114. Subsequent fabrication including bonding of leads and encapsulation and mounting to a heat sink may be also conventionally performed.

Other modifications of controlled rectifier fabrication may be employed. For example, the shorting of a portion of the emitter junction 121 may be performed for increased thermal stability of the breakover characteristic of the device. The edge of the body 110 may be suitably shaped by known techniques to minimize surface breakdown and in general the various techniques of controlling and determining controlled rectifier characteristics may be employed.

The devices described herein have a circular geometry which is both convenient to fabricate and possibly also most desirable for achieving fast turn-on. However, various modifications of emitter and gate contact configuration may be used in keeping with the present invention. A circular sort of geometry may be used but modified by having the emitter centrally disposed with respect to the gate contact and the load disposed in the center thereof.

Devices in accordance with this invention are useful in any of the present controlled rectifier applications and are particularly advantageous in applications requiring sharp rising current pulses. One of the latter applications is in pulsed radar.

While the present invention has been shown and described in a few forms only, it will be understood that numerous variations may be made without departing from the spirit and scope thereof.

What is claimed is:

1. A semiconductor switch capable of fast turn-on and comprising: first, second, third and fourth semiconductive regions alternately of first and second semiconductivity type with a p-n junction between each adjacent pair of regions; first and second load terminals in contact with said first and fourth regions, respectively; a gate contact on said second region; said gate contact being spaced from a first portion of the p-n junction between said first and second regions; said first load terminal being positioned on only a portion of said first region that is spaced from said portion of said p-n junction by a distance at least an order of magnitude greater than the depth of said junction within said second region whereby a substantial lateral voltage drop occurs in said first region when said load terminals are connected in a load circuit and turn-on is initiated by a signal applied to said gate contact.

2. A semiconductor switch in accordance with claim 1 wherein: said first load terminal is on only a portion of said first region remote from said gate contact.

3. A semiconductor switch in accordance with claim 1 wherein: said first region and said gate contact are both disposed on one surface of said second region and said first load terminal is on only a portion of said first region remote from said gate contact.

4. A semiconductor switch in accordance with claim 3 wherein: said first region encloses a portion of said surface on which said gate contact is disposed.

5. A semiconductor switch in accordance with claim 4 wherein: said gate contact has a circular configuration; said first region has an annular configuration concentric with said gate contact; and said first load terminal has an annular configuration with an outer radius substantially the same as that of said first region and an inner radius substantially greater than that of said first region.

6. A semiconductor switch in accordance with claim 2 wherein: the remaining portion of said first region has a thin layer of metal thereon.

7. A semiconductor switch of the controlled rectifier type capable of both fast turn-on and of handling relatively large currents without thermal destruction and comprising: a semiconductor body including first, second, third and fourth successive semiconductive regions alternately of first and second semiconductivity type with a p-n junction between each adjacent pair of regions; first and second load terminals in contact with said first and fourth regions, respectively, each of said load terminals being of metal and having a thickness and a mass substantially greater than that of said semiconductor body; a gate contact on said second region spaced from a first portion of said p-n junction between said first and second regions; said first load terminal being positioned on only a portion of said first region that is spaced from said portion of said p-n junction by a distance at least an order of magnitude greater than the depth of said junction within said second region.

8. A semiconductor switch in accordance with claim 7 wherein: said first region is of impurity diffused semiconductive material.

9. A semiconductor switch in accordance with claim 8 wherein: a thin layer of metal is on the portion of said first region between said portion on which said first load terminal is positioned and said portion of said p-n junction.

10. A semiconductor switch in accordance with claim 8 wherein: the portion of said first region between said portion on which said first load terminal is positioned and said portion of said p-n junction is substantially free of metal.

11. A semiconductor switch in accordance with claim 7 wherein: said first region is of recrystallized semiconductor material and a thin layer of metal is on the portion of said first region between said portion on which said first load terminal is positioned and said portion of said p-n junction.

References Cited

UNITED STATES PATENTS

| | | | |
|---|---|---|---|
| 2,980,832 | 4/1961 | Stein et al. | 317—235 |
| 3,160,800 | 12/1964 | Smart | 317—234 |
| 3,263,139 | 7/1966 | Turner | 317—235 |
| 3,327,183 | 6/1967 | Greenberg et al. | 317—235 |
| 3,344,323 | 9/1967 | Einthoven et al. | 315—235 |

JOHN W. HUCKERT, *Primary Examiner.*

M. H. EDLOW, *Assistant Examiner.*